US010069179B2

(12) United States Patent
Murata et al.

(10) Patent No.: US 10,069,179 B2
(45) Date of Patent: Sep. 4, 2018

(54) BATTERY CASE AND VEHICLE

(71) Applicants: Takashi Murata, Kasugai (JP); Yasumitsu Omi, Okazaki (JP)

(72) Inventors: Takashi Murata, Kasugai (JP); Yasumitsu Omi, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 984 days.

(21) Appl. No.: 14/352,478

(22) PCT Filed: Oct. 24, 2012

(86) PCT No.: PCT/IB2012/002127
§ 371 (c)(1),
(2) Date: Apr. 17, 2014

(87) PCT Pub. No.: WO2013/061132
PCT Pub. Date: May 2, 2013

(65) Prior Publication Data
US 2014/0356666 A1    Dec. 4, 2014

(30) Foreign Application Priority Data
Oct. 28, 2011    (JP) .................................. 2011-237074

(51) Int. Cl.
H01M 10/658 (2014.01)
H01M 10/625 (2014.01)
(Continued)

(52) U.S. Cl.
CPC .... *H01M 10/5016* (2013.01); *B60H 1/00278* (2013.01); *B60K 1/04* (2013.01); *B60L 1/003* (2013.01); *B60L 11/123* (2013.01); *B60L 11/14* (2013.01); *B60L 11/187* (2013.01); *B60L 11/1816* (2013.01); *H01M 2/1077* (2013.01); *H01M 2/1094* (2013.01); *H01M 10/613* (2015.04); *H01M 10/625* (2015.04); *H01M 10/658* (2015.04); *H01M 10/659* (2015.04);
(Continued)

(58) Field of Classification Search
None
See application file for complete search history.

(56) References Cited

U.S. PATENT DOCUMENTS

| 2005/0056472 | A1  | 3/2005 | Smith et al. | |
| 2011/0020676 | A1* | 1/2011 | Kurosawa | B60K 1/04 429/62 |
| 2012/0003510 | A1* | 1/2012 | Eisenhour | H01M 10/625 429/50 |

FOREIGN PATENT DOCUMENTS

| CN | 101651241 A * | 2/2010 | .......... H01M 10/617 |
| CN | 101978549 A | 2/2011 | |

(Continued)

OTHER PUBLICATIONS

Machine translation of CN 201812856 U, printed Oct. 27, 2015.*
(Continued)

*Primary Examiner* — Maria Laios
(74) *Attorney, Agent, or Firm* — Oliff PLC

(57) ABSTRACT

A battery case within which a battery is housed includes a first layer that is made of metal, a second layer that is made of heat insulating material, and a third layer that is made of phase-change heat storage material. The second layer is closer to the battery than the first layer is. The third layer is closer to the battery than the second layer is.

10 Claims, 8 Drawing Sheets

(51) Int. Cl.

| | | |
|---|---|---|
| *H01M 2/10* | (2006.01) | |
| *B60L 1/00* | (2006.01) | |
| *B60L 11/12* | (2006.01) | |
| *B60L 11/14* | (2006.01) | |
| *B60L 11/18* | (2006.01) | |
| *B60K 1/04* | (2006.01) | |
| *B60H 1/00* | (2006.01) | |
| *H01M 10/6568* | (2014.01) | |
| *H01M 10/6569* | (2014.01) | |
| *H01M 10/613* | (2014.01) | |
| *H01M 10/659* | (2014.01) | |
| *B60K 1/00* | (2006.01) | |
| *H01M 10/6563* | (2014.01) | |
| *H01M 10/635* | (2014.01) | |
| *H01M 10/6565* | (2014.01) | |

(52) U.S. Cl.
CPC ... *H01M 10/6568* (2015.04); *H01M 10/6569* (2015.04); *B60K 2001/005* (2013.01); *B60K 2001/0433* (2013.01); *B60K 2001/0438* (2013.01); *B60L 2210/10* (2013.01); *B60L 2210/40* (2013.01); *B60L 2240/662* (2013.01); *B60Y 2400/61* (2013.01); *H01M 10/635* (2015.04); *H01M 10/6563* (2015.04); *H01M 10/6565* (2015.04); *H01M 2220/20* (2013.01); *Y02T 10/6217* (2013.01); *Y02T 10/7005* (2013.01); *Y02T 10/7072* (2013.01); *Y02T 10/7077* (2013.01); *Y02T 10/7094* (2013.01); *Y02T 10/7216* (2013.01); *Y02T 10/7241* (2013.01); *Y02T 10/7291* (2013.01); *Y02T 90/127* (2013.01); *Y02T 90/14* (2013.01); *Y02T 90/16* (2013.01)

(56) References Cited

FOREIGN PATENT DOCUMENTS

| | | | | |
|---|---|---|---|---|
| CN | 201812856 U | * | 4/2011 | ............. H01M 2/02 |
| JP | S60-192367 U | | 12/1985 | |
| JP | H08-303683 A | | 11/1996 | |
| JP | H10-144361 A | | 5/1998 | |
| JP | A-11-135160 | | 5/1999 | |
| JP | A-2005-093434 | | 4/2005 | |
| JP | A-2006-092894 | | 4/2006 | |
| JP | 2008-047371 A | | 2/2008 | |
| JP | A-2008-088811 | | 4/2008 | |
| JP | A-2008-246691 | | 10/2008 | |
| JP | A-2009-140786 | | 6/2009 | |
| JP | 2009-227121 A | | 10/2009 | |
| JP | A-2010-192333 | | 9/2010 | |
| WO | WO 2009/119037 A1 | * | 2/2011 | ............. H01M 10/50 |

OTHER PUBLICATIONS

Machine translation of CN 1 01 651 241 A, printed Jan. 8, 2017.*
Partial English Translation of Sep. 30, 2015 Office Action issued in Chinese Patent Application No. 201280052533.3.
Partial translation of May 19, 2015 Office Action issued in Japanese Application No. 2011-237074.

* cited by examiner

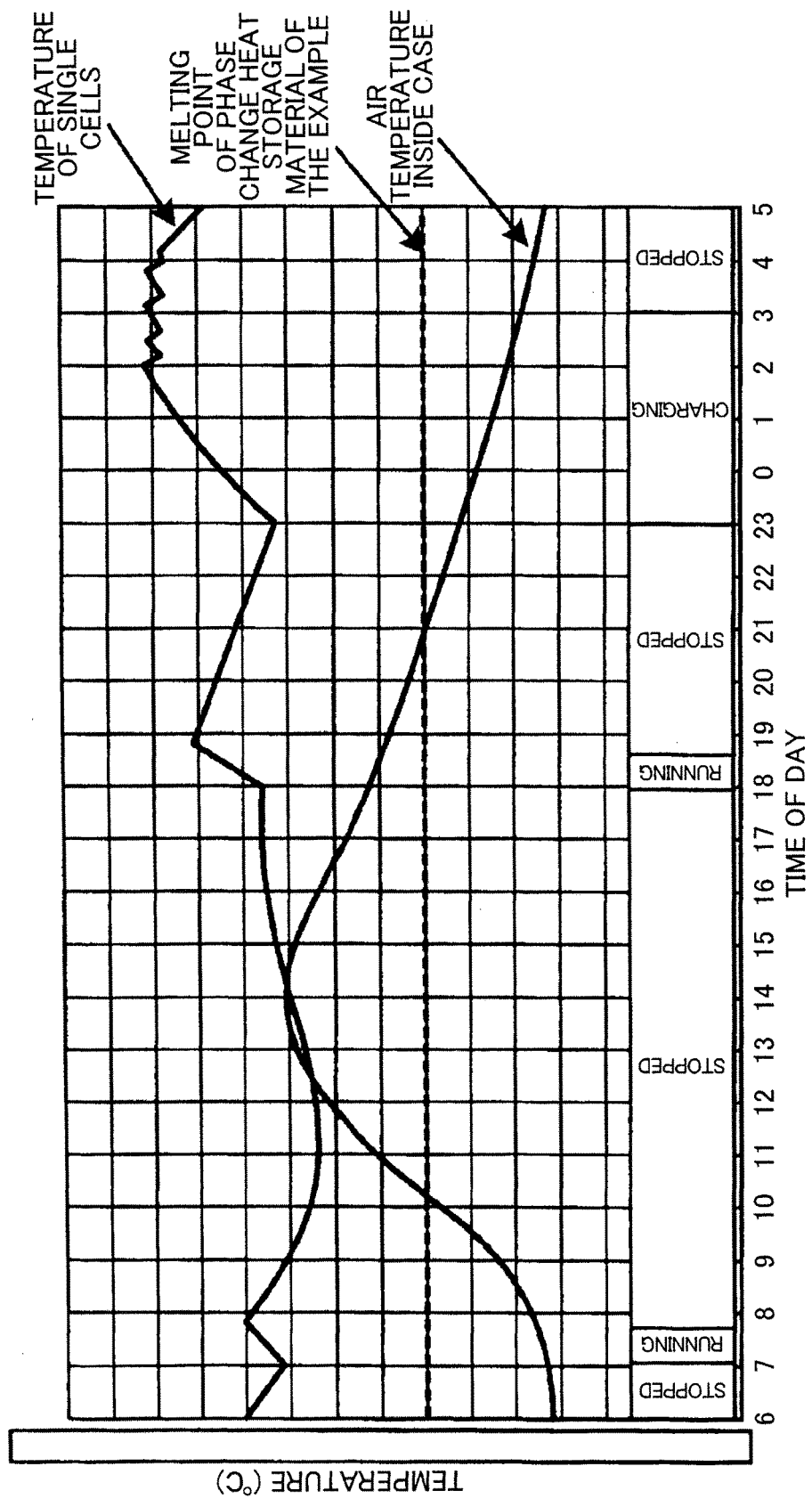

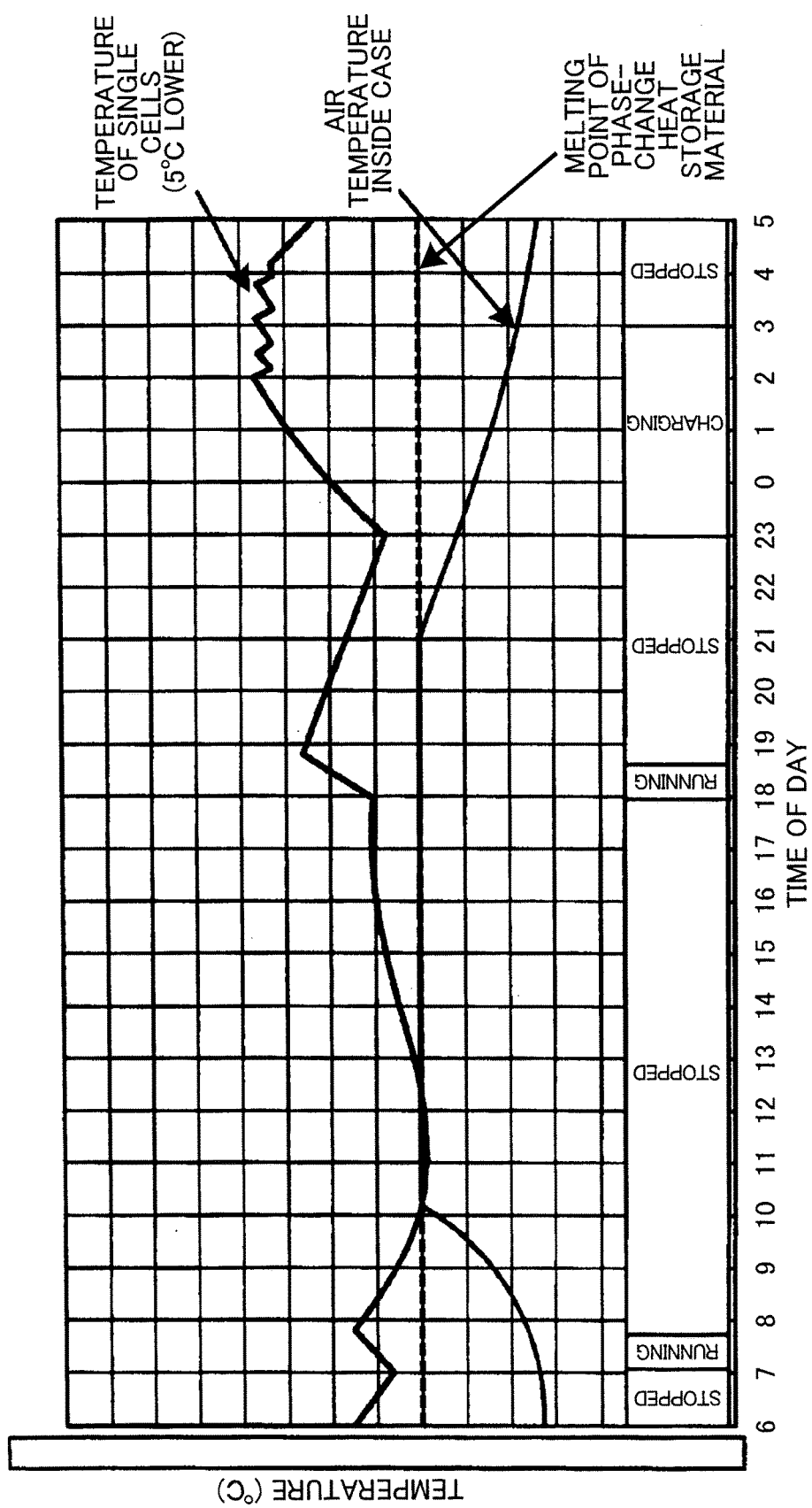

BATTERY CASE AND VEHICLE

BACKGROUND OF THE INVENTION

1. Field of the Invention

The invention relates to technology for adjusting the temperature inside a battery case.

2. Description of Related Art

In recent years, electric vehicles and hybrid vehicles and the like that have an electric motor for running the vehicle are receiving a lot of attention as environmentally friendly vehicles and have come to be put into practical use. The electric motor is driven by electric power output from a battery that has a plurality of single cells capable of charging and discharging.

In a high temperature environment, the battery will deteriorate faster, so the life of the battery will be shorter. Therefore, various countermeasures against heat are being implemented.

Japanese Patent Application Publication No. 2005-093434 (JP 2005-093434 A) describes a system that cools the inside of a battery case. In this cooling system, when the temperature inside the battery chamber is higher than the temperature outside the vehicle, air from outside the vehicle is introduced into the battery case by driving a fan. When the temperature outside the vehicle is higher than the temperature inside the battery case, the air that is drawn in by driving the fan is introduced into the battery case after first being cooled by being passed through an evaporator coil.

However, in JP 2005-093434 A, the fan must be driven in order to cool the battery, so the amount of energy consumed increases. When the temperature outside the vehicle is higher than the temperature inside the battery case, that air must be cooled using air-conditioning refrigerant. Therefore, it is not possible to suppress an increase in the temperature of the battery while the vehicle is stopped.

SUMMARY OF THE INVENTION

The invention thus provides a battery case and a vehicle that suppresses an increase in the amount of energy used to cool a battery.

A first aspect of the invention relates to a battery case within which a battery is housed. This battery case includes a first layer that is made of metal, a second layer that is made of heat insulating material, and a third layer that is made of phase-change heat storage material. The second layer is closer to the battery than the first layer is. The third layer is closer to the battery than the second layer is.

In the first aspect of the invention, the battery may be a group of batteries in which a plurality of single cells are arranged. With this structure, the group of batteries that is made of a plurality of single cells is protected from excessive heat.

A second aspect of the invention relates to a vehicle that includes a battery case, a motor and the battery that supplies electric power to operate the motor. The battery case includes a first layer, a second layer and a third layer. The first layer is made of metal. The second layer is made of heat insulating material, and is closer to the battery than the first layer is. The third layer is made of phase-change heat storage material, and is closer to the battery than the second layer is. The motor generates motive power for running the vehicle. According to this structure, in the vehicle, an increase in the amount of energy consumed to cool the battery is suppressed.

The vehicle according to the second aspect of the invention may also include a heat radiating portion of the vehicle, and a heat transport device. The heat transport device may be provided with a first heat exchanger, a second heat exchanger and a circulation path that circulates refrigerant between the first heat exchanger and the second heat exchanger. The first heat exchanger may be arranged inside the battery case. The second heat exchanger may be arranged in the heat radiating portion, outside of the battery case. According to this structure, the synergetic effect from the battery case and the heat transport device enables an increase in the temperature of the battery to be even more effectively suppressed.

In the vehicle according to the second aspect of the invention, the circulation path may have a first connecting tube and a second connecting tube. The first connecting tube may be configured to move the refrigerant to the second heat exchanger, the refrigerant having changed from a liquid state to a vapor state through first heat exchange with air inside the battery case. Here, the first exchange may be performed in the first heat exchanger. The second connecting tube may be configured to move the refrigerant to the first heat exchanger, the refrigerant having changed from the vapor state to the liquid state through second heat exchange with the heat radiating portion. Here, the second heat exchange may be performed in the second heat exchanger.

In the vehicle according to the second aspect of the invention, the second heat exchanger may be positioned higher than the first heat exchanger in a vehicle height direction. Also, the first connecting tube may have a first vertical tube that extends in a vertical direction of the vehicle and the second connecting tube may have a second vertical tube that extends in the vertical direction of the vehicle. Further, the heat transport device may be configured to naturally circulate the refrigerant between the first heat exchanger and the second heat exchanger via the first connecting tube and the second connecting tube. According to this structure, neither a pump for moving the refrigerant, nor a power supply or the like is necessary, so the amount of energy that is consumed to operate the heat transport device is suppressed.

In the vehicle according to the second aspect of the invention, the heat radiating portion may be a ventilating duct that allows air to flow between inside and outside of the vehicle. According to this structure, heat generated at the second heat exchanger is radiated to outside the vehicle by a simple structure.

In the vehicle according to the second aspect of the invention, the second heat exchanger may be arranged in an unirradiated region, inside the ventilating duct. The unirradiated region may be not by direct sunlight that enters the ventilating duct. According to this structure, the second heat exchanger is prevented from heating up from direct sunlight, so the heat exchange efficiency of the second heat exchanger is increased.

In the vehicle according to the second aspect of the invention, the ventilating duct may have an inclined tube portion and a straight tube portion that extends in the vertical direction of the vehicle. Further, the second heat exchanger may be arranged in the inclined tube portion. The inclined tube portion may be inclined with respect to the vertical direction of the vehicle and includes the unirradiated region. According to this structure, the unirradiated region is able to be easily formed.

In the vehicle according to the second aspect of the invention, an on-off valve may be provided in the ventilating duct. The on-off valve may operate between an open position that allows air to pass through and a closed position that inhibits air from passing through.

The vehicle according to the second aspect of the invention may also include a driving portion that drives the on-off valve. This driving portion may be configured to operate the on-off valve to the closed position when a temperature outside the vehicle is lower than a predetermined threshold, and be configured to operate the on-off valve to the open position when the temperature outside the vehicle is equal to or higher than the predetermined threshold value. Here, the a predetermined threshold value may be set based on an input/output characteristic of the battery.

According to the invention, it possible to suppress an increase in the amount of energy consumed to cool a battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6A is a graph showing the results of a measured change in temperature over time in a single cell according to a comparative example;

FIG. 6B is a graph showing the results of a measured change in temperature over time in a single cell according to an example.

DETAILED DESCRIPTION OF EMBODIMENTS

Figure 1:
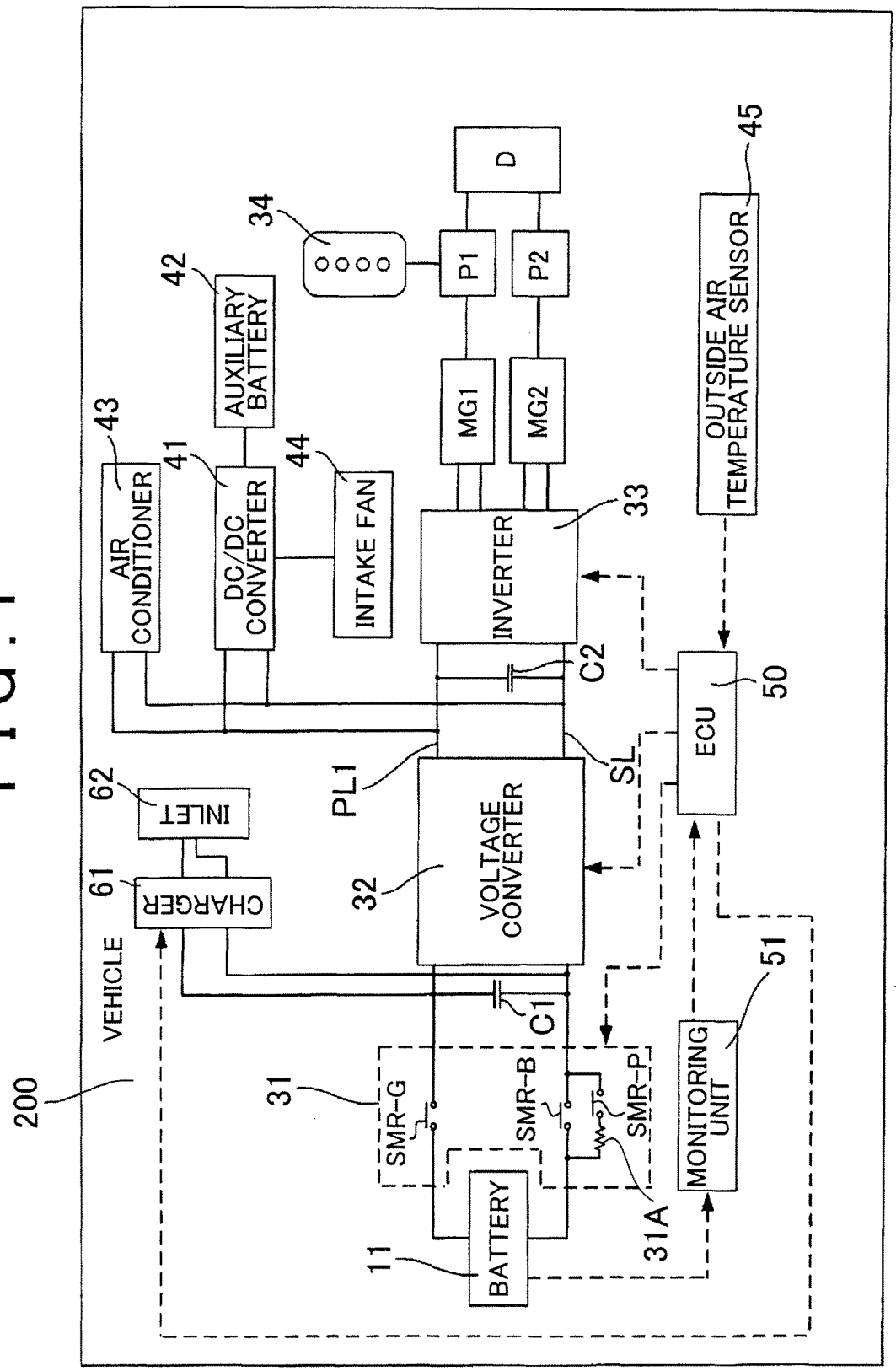
FIG. 1 is a block diagram of the hardware structure of a portion of a vehicle.

Hereinafter, example embodiments of the invention will be described in detail with reference to the accompanying drawings. FIG. 1 is a block diagram showing the hardware structure of a portion of a vehicle according to a first example embodiment of the invention. In the drawing, the broken arrows indicate the directions in which signals flow. A vehicle 200 has a drive path that drives a motor using output from a battery, and a drive path from an engine. In the example embodiments of the invention, the vehicle 200 is a plug-in hybrid vehicle in which the battery can be charged using an external power supply outside the vehicle. However, the vehicle 200 may also be an electric vehicle in which the battery can be charged using an external power supply outside the vehicle, and that is not provided with the engine. Also, the vehicle 200 may be a hybrid vehicle in which the battery is unable to be charged using an external power supply outside the vehicle.

Referring to the drawing, the vehicle 200 includes a battery 11, smoothing capacitors C1 and C2, a voltage converter 32, an inverter 33, a motor-generator MG1, a motor-generator MG2, a power split planetary gear P1, a reduction planetary gear P2, a reduction gear D, an engine 34, a relay 31, a DC/DC converter 41, an auxiliary battery 42, an air conditioner 43, an intake fan 44, an outside air temperature sensor 45, an Electronic Control Unit (ECU 50), a monitoring unit 51, a charger 61, and a charging inlet 62.

The vehicle 200 also includes a power line PL1 and a ground line SL. The battery 11 is connected to the voltage converter 32 via system main relays SMR-G, SMR-B, and SMR-P that make up the relay 31. The system main relay SMR-G is connected to a plus terminal, of the battery 11, and the system main relay SMR-B is connected to a minus terminal of the battery 11. Also, the system main relay SMR-P and a precharge resistor 31A are connected in parallel with the system main relay SMR-B.

These system main relays SMR-G, SMR-B, and SMR-P are relays in which the contact point is closed when current flows through the coils. When the SMRs are on, they are energized (i.e., current is able to flow) and when the SMRs are off, they are de-energized (i.e., current is unable to flow).

The ECU 50 turns off all of the system main relays SMR-G, SMR-B, and SMR-P when the flow of current is interrupted, i.e., when an ignition switch is in an OFF position. That is, the ECU 50 turns off the excitation current to the coils of the system main relays SMR-G, SMR-B, and SMR-P. The ignition switch switches in order from the OFF position to the ON position.

The ECU 50 is responsible for controlling the entire vehicle 200. The ECU 50 may also be a Central Processing Unit (CPU) or a Micro Processing Unit (MPU). The ECU 50 may also include an Application Specific Integrated Circuit (ACIC) that executes, in a circuit-like manner, at least a portion of the processes executed in the CPU or the like. Also, there may be only one CPU or the like, or there may be a plurality of CPUs or the like. Therefore, for example, the CPU that controls the voltage converter 32 may be different from the CPU that controls the driving of the intake fan 44. The ECU 50 is activated by electric power being supplied from the auxiliary battery 42.

When the hybrid system is started (i.e., when the main power supply is connected), that is, when a driver depresses a brake pedal and pushes a push-type start switch, for example, the ECU 50 first turns on the system main relay SMR-G. Next, the ECU 50 turns on the system main relay SMR-P, and executes precharging.

The precharge resistor 31A is connected to the system main relay SMR-P. Therefore, even if the system main relay SMR-P is turned on, the input voltage to the inverter 33 will increase gradually, thus preventing an inrush of current.

When the ignition switch is switched from the ON position to the OFF position, the ECU 50 first turns off the system main relay SMR-B and then turns off the system main relay SMR-G This interrupts the electrical connection between the battery 11 and the inverter 33, thus cutting off the power supply. The system main relays SMR-G, SMR-B, and SMR-P are controlled to electrically connected/electrically disconnected states according to control signals sent from the ECU 50.

The capacitor C1 is connected between the power line PL1 and the ground line SL, and smoothes out the voltage between the lines. Also, the DC/DC converter 41 and the air conditioner 43 are connected in parallel between the power line PL1 and the ground line SL. The DC/DC converter 41 steps down the voltage of the electric power supplied from the battery 11, and charges the auxiliary battery 42 or supplies electric power to the intake fan 44. Also, the air conditioner 43 operates by receiving a supply of electric power from the battery 11.

The voltage converter 32 steps up the voltage between terminals of the capacitor C1. The capacitor C2 smoothes out the voltage that has been stepped up by the voltage converter 32. The inverter 33 converts direct-current voltage supplied from the voltage converter 32 into three-phase alternating current, and outputs this three-phase alternating current to the motor-generator MG2. The reduction planetary gear P2 transmits motive power obtained with the motor-generator MG2 to the reduction gear D, and drives the vehicle 200. The power split planetary gear P1 splits the motive power obtained with the engine 34 into two paths. One of the power split into two paths is transmitted to wheels via the reduction gear D. The other of the motive power split into two paths drives the motor-generator MG1 to generate electric power.

This electric power generated in the motor-generator MG1 is used to drive the motor-generator MG2. The motor-generator MG2 assists the engine 34. Also, when the vehicle decelerates, the reduction planetary gear P2 transmits the motive power that is transmitted via the reduction gear D to the motor-generator MG2, and drives the motor-generator MG2 as a generator. This electric power obtained with the motor-generator MG2 is converted from three-phase alternating current to direct-current voltage in the inverter 33, and then transmitted to the voltage converter 32. At this time, the ECU 50 controls the voltage converter 32 such that the voltage converter 32 operates as a step-down circuit. The electric power that has been stepped down by the voltage converter 32 is stored in the battery 11.

The monitoring unit 51 obtains information related to the voltage, current, and temperature of the battery 11. The monitoring unit 51 is unitized with the battery 11. The monitoring unit 51 outputs information obtained from the battery 11 to the ECU 50. The ECU 50 then controls the charging/discharging of the battery 11, or controls the driving of the air conditioner 43 and the intake fan 44, based on the information obtained from the monitoring unit 51.

Here, the intake fan 44 supplies air from inside the vehicle cabin to the battery 11 according to a rotational motion. That is, the ECU 50 operates the intake fan 44 when it is determined that the temperature of the battery 11 is higher than a predetermined value, when the ignition switch of the vehicle 200 is on. This enables the battery 11 to be protected. The predetermined value in this case may be set as appropriate from the viewpoint of inhibiting deterioration of the battery 11 from progressing. The predetermined value may be 45° C., for example. Also, when the temperature inside the vehicle cabin is higher than the temperature of the battery 11, the ECU 50 may operate the air conditioner 43 to reduce the temperature of the air inside the vehicle cabin that will be drawn in by the intake fan 44. The intake fan 44 may be a sirrocco-type fan or a cross flow-type fan.

The charger 61 is connected to the battery 11 via the relay 31. When the relay 31 is open, the battery 11 is electrically disconnected from the voltage converter 32 and the charger 61 and the like. When the relay 31 is closed, the battery 11 is electrically connected to the voltage converter 32 and the charger 61 and the like.

When the battery 11 is being charged by a commercial power supply outside the vehicle, the ECU 50 produces a drive signal for driving the charger 61 and outputs this signal. The charging inlet 62 may be provided on a side portion of the vehicle 200. A connector of a charging cable that connects the vehicle to an external power supply is connected to the charging inlet 62. The example embodiments of the invention may also be applied to non-contact charging in which the charging inlet 62 and the connector are not connected. The ECU 50 does not drive the air conditioner 43 when the battery 11 is being charged by the charger 61 (i.e., when charging while the vehicle 200 is stopped).

Figure 2A:
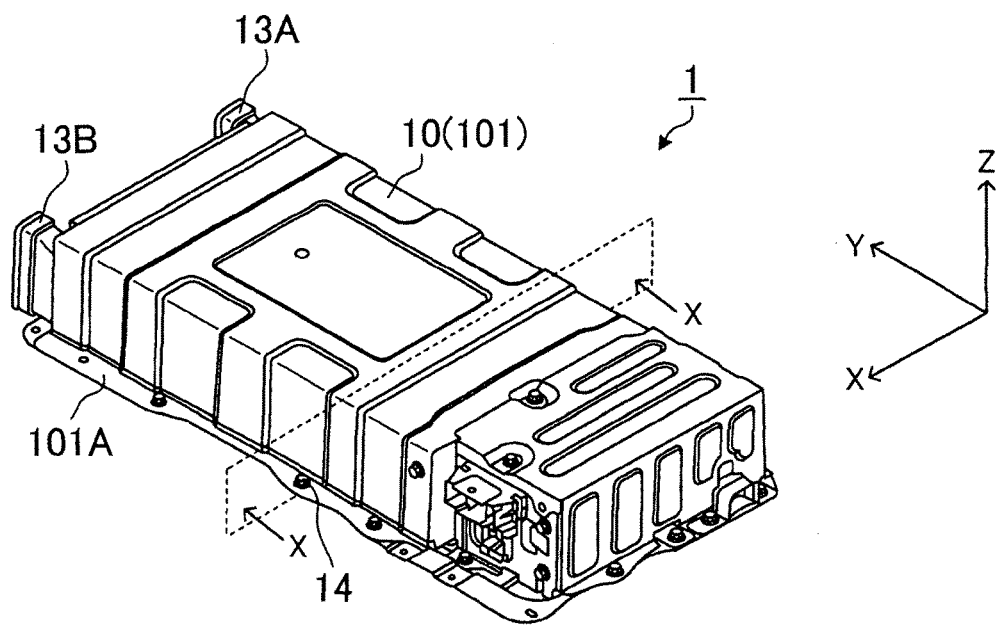
FIG. 2A is a perspective view of a battery pack according to first and second example embodiments of the invention.
Figure 2B:
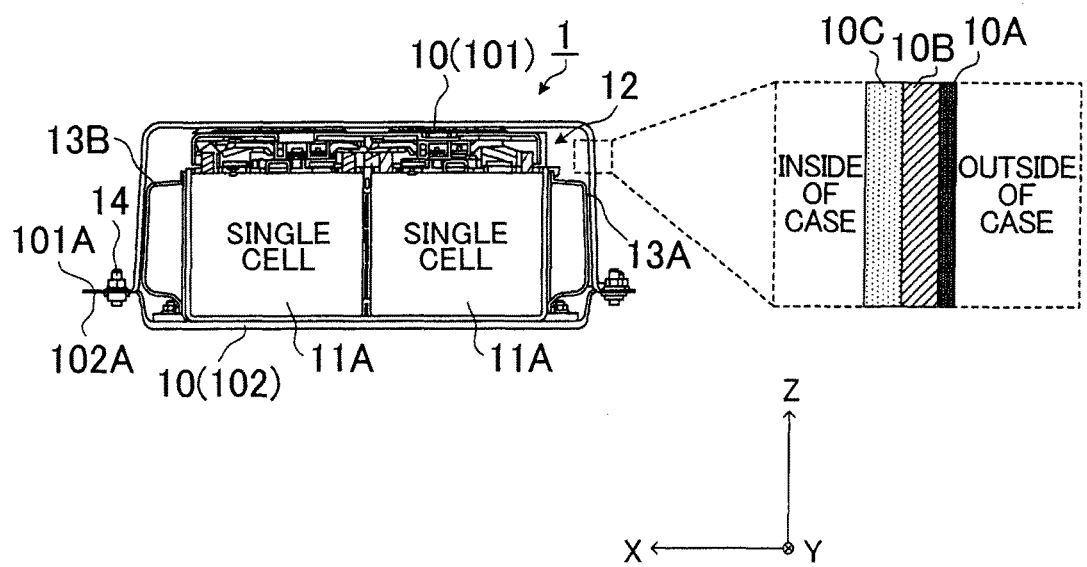
FIG. 2B is a sectional view of the battery pack according to the first and second example embodiments.

Next, a battery pack that includes the battery will be described in detail with reference to FIGS. 2A and 2B. FIG. 2A is a perspective view of the battery pack according to the example embodiments, and FIG. 2B is a sectional view of the battery pack shown in FIG. 2A cut along plane X-X', and shows an enlargement of the cross section of a case wall portion. In these drawings, the X, Y, and Z axes are three different axes that are orthogonal to one another.

The battery pack 1 includes the battery 11 and a battery case 10 within which the battery 11 is housed. The battery pack 1 is arranged in a luggage room toward the rear of the vehicle, for example. The battery 11 has groups of batteries that are lined up in the X-axis direction. These groups of batteries are each formed by single cells 11A that are arranged in the Y-axis direction. Gaps for introducing air, i.e., cooling passages, are formed between single cells 11A that are adjacent in the Y-axis direction.

A bus bar module 12 in which a plurality of bus bars for electrically connecting the single cells 11A in series are retained is positioned on one end portion side of the battery 11 in the Z-axis direction. However, the group of batteries may also include single cells 11A that are electrically connected in parallel. Also, there may be only one group of batteries or three or more groups of batteries. The bus bars are unitized by the bus bar module 12, so the work of attaching the bus bars is be simplified.

The single cells 11A may be secondary batteries such as lithium-ion batteries or nickel-metal hydride batteries, or they may be capacitors. Each of the single cells 11A may also be a single battery cell, or a battery module in which a plurality of single battery cells are connected together. A battery cell in this case refers to the smallest element able to be charged and discharged.

Each of the single cells 11A is a so-called square battery that has a pair of outside surfaces that oppose each other in the X-axis direction, a pair of outside surfaces that oppose each other in the Y-axis direction, and a pair of outside surfaces that oppose each other in the Z-axis direction. However, the single cells 11A may also be circular cylindrical batteries.

An intake chamber 13A is provided at one end portion of the battery 11 in the X-axis direction. An exhaust chamber 13B is provided at the other end portion of the battery 11 in the X-axis direction. However, the intake chamber 13A may be provided at one end portion of the battery 11 in the Z-axis direction, and the exhaust chamber 13B may be provided at the other end portion of the battery 11 in the Z-axis direction. The intake chamber 13A is communicated with the inside of the vehicle cabin via an intake passage, not shown.

The intake fan 44 shown in FIG. 1 is provided in this intake passage. When the intake fan 44 is operated, air from inside the vehicle cabin is drawn into the intake chamber 13A via this intake passage. The air that has been drawn into the intake chamber 13A cools the single cells 11A as the air moves through the cooling passages formed between adjacent single cells 11A. Then, the air is exhausted to the exhaust chamber 13B.

On the other hand, when the ignition switch of the vehicle 200 is off, cooling control of the battery 11 by drawing in air from inside the vehicle cabin is not performed. Usually, during the life of the vehicle 200, the period of time during which the vehicle 200 is stopped, i.e., not running, (i.e., in which the ignition switch of the vehicle 200 is off) is longer than the period of time during which the vehicle 200 is running (i.e., in which the ignition switch of the vehicle 200 is on). Therefore, it is extremely important to control the temperature of the battery 11 even when the vehicle 200 is stopped. In particular, when the surrounding environment of the vehicle 200 when the vehicle 200 is stopped is a high temperature, the temperature inside the vehicle cabin rises from the outside air, so the temperature of the battery 11 also rises, and as a result, deterioration of the battery 11 progresses. Hereinafter, the battery case 10 that has a structure that suppresses an increase in the temperature of the battery 11 will be described in detail.

The battery case 10 includes a pair of cases, i.e., an upper case 101 and a lower case 102. An upper flange 101A that extends in the X-Y plane direction is formed on a lower end portion of the upper case 101. A lower flange 102A that extends in the X-Y plane direction is formed on an upper end portion of the lower case 102. The upper flange 101A and the lower flange 102A oppose one another in the Z-axis direction, and are connected together by a fastening member 14 being fastened. Thus, the inside of the battery case 10 is a sealed structure that is closed off from the outside of the vehicle 200.

The battery case 10 is a structure in which metallic material 10A (that serves as a first layer), heat insulating material 10B (that serves as a second layer), and phase-change heat storage material 10C (that serves as a third layer) are arranged in order from the outside toward the inside of the case. That is, the heat insulating material 10B is closer to the battery 11 than the metallic material 10A is, and the phase-change heat storage material 10C is closer to the battery 11 than the heat insulating material 10B is. The metallic material 10A may be galvanized steel sheet, for example. The heat insulating material 10B may be closed-cell foam PP, for example. The phase-change heat storage material 10C conforms to the surrounding temperature at or below a melting point of the phase-change heat storage material 10C. When the surrounding temperature reaches the melting point, the phase-change heat storage material 10C starts to melt. Then, a solid-liquid coexistence state of the phase-change heat storage material 10C continues for a certain period of time. Also, the phase-change heat storage material 10C maintains the same temperature as the melting point without conforming to the surrounding temperature in the state in the solid-liquid coexistence state. When the phase-change heat storage material 10C becomes completely liquid, it conforms to the surrounding temperature and starts to increase in temperature.

For example, when the melting point of the phase-change heat storage material 10C is 26° C., the phase-change heat storage material 10C will absorb the surrounding heat without increasing in temperature until it completely melts, even if the surrounding temperature is equal to or greater than 26° C. The phase-change heat storage material 10C may be a soft container that encapsulates therein sodium acetate trihydrate or the like, for example. Aside from material having a melting point of 26° C., other material that has a melting point appropriate for protecting the battery 11 from external heat (i.e., external heat from the air or the like inside the battery case 10) may also be used. Here, the melting point appropriate for protecting the battery 11 from external heat differs depending on the type of single cells 11A that make up the battery 11 and the like.

The metallic material 10A absorbs electromagnetic waves emitted from the battery 11, thereby preventing the electromagnetic waves emitted from the battery 11 from becoming noise and causing communication problems. Communication problems in this case refers to noise entering received signals for audio equipment such as a TV received by an antenna provided on the vehicle 200, for example. Also, the metallic material 10A is arranged on the outermost layer of the battery case 10 in order to protect the single cells 11A from impact from the outside.

The heat insulating material 10B is provided to prevent heat exchange between outside air and the phase-change heat storage material 10C (in other words, to ensure that the phase-change heat storage material 10C performs heat exchange with only the air inside the battery case 10). Therefore, the heat insulating material 10B is arranged between the metallic material 10A and the phase-change heat storage material 10C.

Next, the effects obtained as a result of the heat insulating material 10B and the phase-change heat storage material 10C being arranged in this order from the outside toward the inside of the battery case 10 will be described in detail. When the temperature outside the battery case 10 is higher than the temperature inside the battery case 10, the metallic material 10A that is positioned on the outermost layer becomes heated from the air outside the battery case 10. The heat insulating material 10B is positioned between the metallic material 10A and the phase-change heat storage material 10C, so the heat of the metallic material 10A is inhibited from being transferred to the phase-change heat storage material 10C. As a result, the battery 11 is protected from external heat outside the vehicle.

On the other hand, if the temperature of the surrounding environment of the vehicle 200 becomes high while the ignition switch of the vehicle 200 is off, the temperature inside the vehicle cabin will rise from the external heat, and the temperature inside the battery case 10 that is communicated with the inside of the vehicle cabin will also rise. If the temperature inside the battery case 10 increases further and reaches the melting point of the phase-change heat storage material 10C, the phase-change heat storage material 10C will absorb the heat inside the battery case 10, while maintaining the same temperature as the melting point. As a result, an increase in the temperature of the battery 11 is suppressed.

As described above, the battery 11 is protected from external heat by the metallic material 10A, the heat insulating material 10B, and the phase-change heat storage material 10C being arranged in this order from the outside toward the inside of the battery case 10. Moreover, there is no need to drive the air conditioner 43 and the intake fan 44 to protect the battery 11 from external heat. Thus, the battery 11 is protected while the amount of electric power that is consumed is reduced.

In the invention, another plate-shaped member other than the heat insulating material 10B may also be included between the metallic material 10A and the phase-change heat storage material 10C.

A second example embodiment of the invention has the same structure of the first example embodiment with the addition of a heat transport device 2. The heat transport device 2 effectively further suppresses an increase of the temperature inside the battery case 10.

Figure 3:
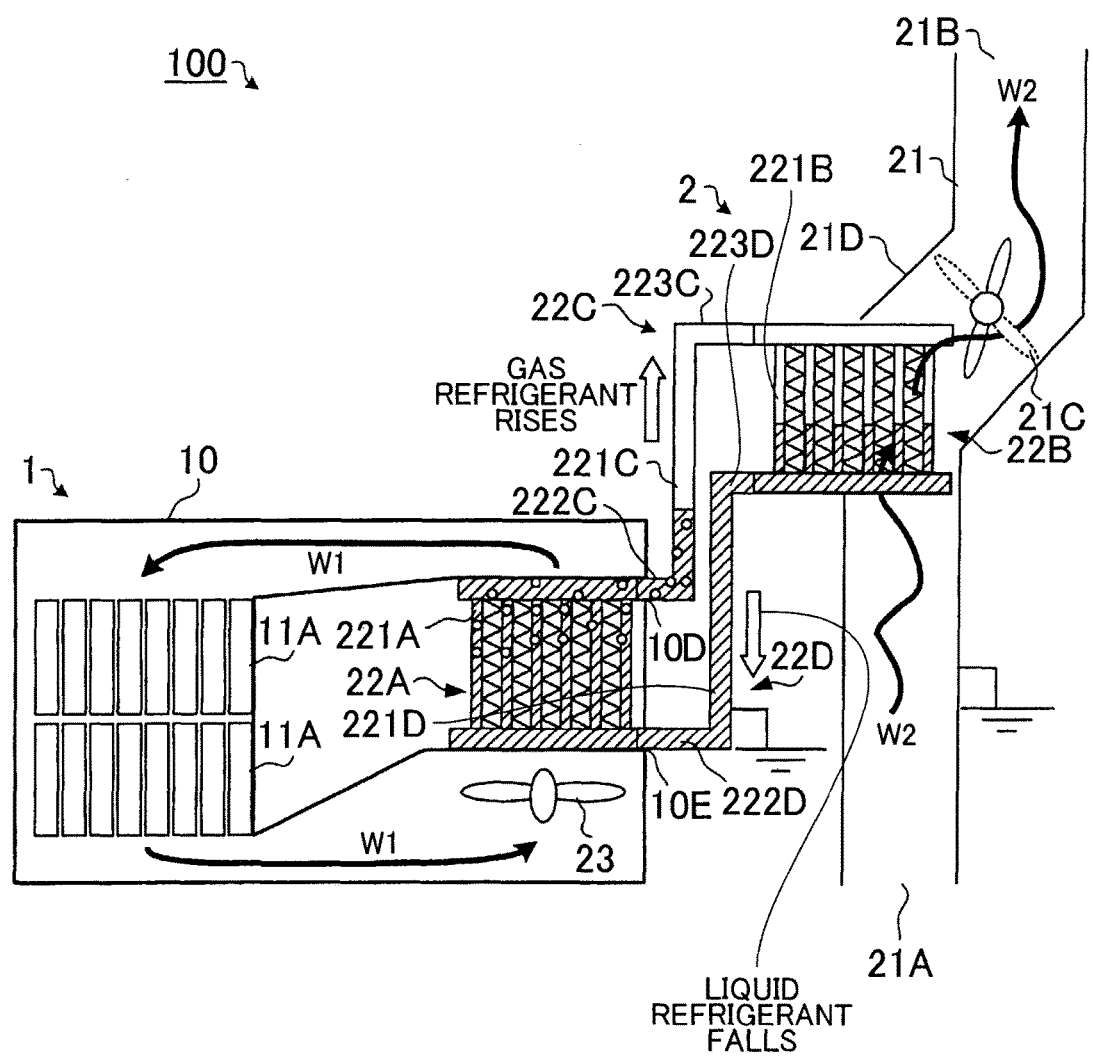
FIG. 3 is a view showing a frame format of an example of a battery cooling system that includes a heat transport device and the battery pack according to the second example embodiment.
Figure 4:
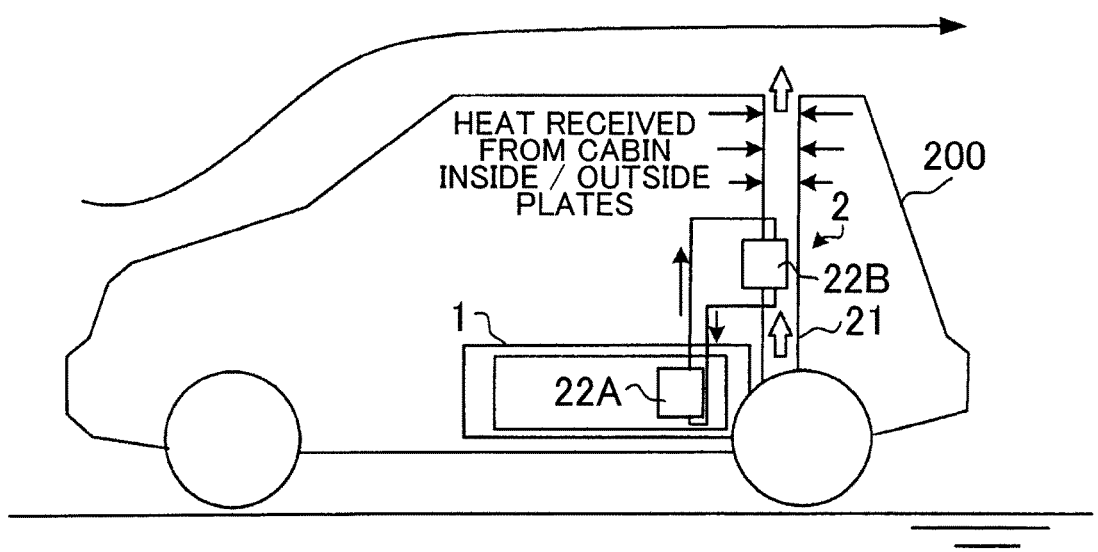
FIG. 4 is a schematic view of a vehicle provided with the heat transport device and the battery pack according to the second example embodiment.

FIG. 3 is a view showing a frame format of an example of a battery cooling system provided with the battery pack 1 and the heat transport device 2 (i.e., a cooling mechanism). FIG. 4 is a view showing a frame format of a vehicle provided with the battery pack 1 and the heat transport device 2. Elements having the same functions as in the first example embodiment are denoted by like reference characters. A battery cooling system 100 has the battery pack 1, and the heat transport device 2 that is a mechanism that cools the battery pack 1. The heat transport device 2 has ventilating duct 21, a pack internal heat exchanger 22A (that serves as a first heat exchanger), a pack external heat exchanger 22B (that serves as a second heat exchanger), and a cooling fan 23.

Figure 5:
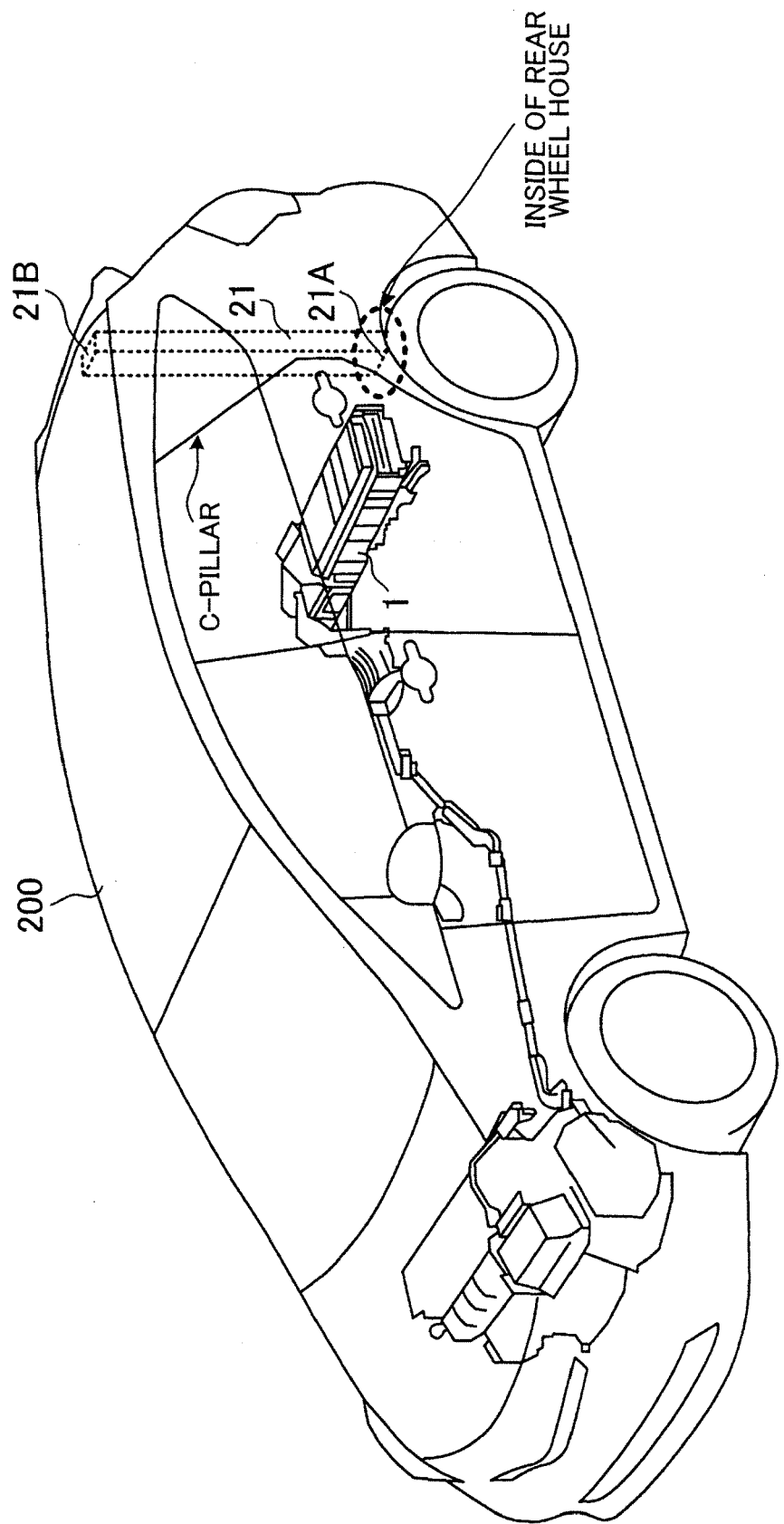
FIG. 5 is a perspective view in which a portion of the vehicle according to the second example embodiment is transparent.

The ventilating duct 21 has an inlet 21A at a lower portion of the vehicle 200, and an outlet 21B at an upper portion of the vehicle 200. The ventilating duct 21 is arranged substantially vertical with respect to the ground. That is, the ventilating duct 21 extends in a vertical direction of the vehicle 200. Here, overall, the ventilating duct 21 may incline with respect to the vertical direction of the vehicle 200. The inlet 21A may also be provided in an upper portion inside a rear wheel house, as shown in FIG. 5. The outlet 21B may also be provided near an upper portion of a C-pillar. Also, the ventilating duct 21 has an on-off valve 21C between the outlet 21B and the pack external heat exchanger 22B. The on-off valve 21C switches between an open position that ventilation between the inside of the ventilating duct 21 and the outside air, and a closed position that inhibits ventilation between the inside of the ventilating duct 21 and the outside air. The on-off valve 21C is fundamentally positioned in the open position. The operating method for operating the on-off valve 21C will be described later.

The pack internal heat exchanger 22A is positioned inside the battery case 10. A plurality of conduits 221A that extend in the vertical direction are formed inside the pack internal heat exchanger 22A. These conduits 221A are filled with liquid refrigerant shown by hatching. Here, the liquid refrigerant may be a low-boiling agent (material) that boils at a temperature of 40° to 60° C. The conduits 221A may be made of metal such as aluminum that has high heat conductivity.

The pack internal heat exchanger 22A is connected to the pack external heat exchanger 22B via a first connecting tube 22C and a second connecting tube 22D. The first connecting tube 22C and the second connecting tube 22D together form a circulation path. The first connecting tube 22C has a vertical tube 221C (that serves as a first vertical tube) that extends in the vertical direction of the vehicle 200, a lower horizontal tube 222C that extends, in a horizontal direction of the vehicle 200 from a lower end portion of the vertical tube 221C, and an upper horizontal tube 223C that extends in the horizontal direction of the vehicle 200 from an upper end portion of the vertical tube 221C. Here, the lower horizontal tube 222C and upper horizontal tube 223C may incline with respect to the horizontal direction of the vehicle 200. The first connecting tube 22C may be made of metal such as aluminum that has high heat conductivity.

The lower horizontal tube 222C is connected to the pack internal heat exchanger 22A through a first open portion 10D of the battery case 10. A seal, not shown, is provided between the lower horizontal tube 222C and the first open portion 10D. The seal may be made of rubber. Providing the seal between the lower horizontal tube 222C and the first open portion 10D enables the battery case 10 to be kept sealed. A portion of the vertical tube 221C and the entire lower horizontal tube 222C are filled with a low-boiling agent in a liquid state shown by hatching. The remainder of the vertical tube 221C and the entire upper horizontal tube 223C are filled with a low-boiling agent that has been changed from a liquid state to a vapor state by heat exchange with the battery 11.

The second connecting tube 22D has a vertical tube 221D (that serves as a second vertical tube) that extends in the vertical direction of the vehicle 200, a lower horizontal tube 222D that extends in the horizontal direction of the vehicle 200 from a lower end portion of the vertical tube 221D, and an upper horizontal tube 223D that extends in the horizontal direction of the vehicle 200 from an upper end portion of the vertical tube 221D. The lower horizontal tube 222D is connected to the pack internal heat exchanger 22A through a second open portion 10E of the battery case 10. A seal, not shown, is provided between the lower horizontal tube 222D and the open portion 10E. The seal may be made of rubber. Providing the seal between the lower horizontal tube 222D and the second open portion 10E enables the battery case 10 to be kept sealed. The entire second connecting tube 22D is filled with a low-boiling agent in a liquid state shown by hatching.

The pack external heat exchanger 22B is arranged higher than the pack internal heat exchanger 22A with respect to the ground. That is, the pack external heat exchanger 22B is positioned higher than the pack internal heat exchanger 22A in the vertical direction of the vehicle 200. The pack external heat exchanger 22B extends inside of a curved portion 21D (that serves as a heat radiating portion and an inclined tube portion of the vehicle) of the ventilating duct 21. Therefore, the pack external heat exchanger 22B is arranged in a position that is not visible from the outlet 21B, i.e., in an unirradiated region other than an irradiated region that is irradiated by direct sunlight that enters the ventilating duct 21 from the outlet 21B. That is, the unirradiated region is not irradiated by direct sunlight that enters the ventilating duct 21. Thus, the pack external heat exchanger 22B is prevented from heating up, from direct sunlight.

A plurality of conduits 221B that extend in the vertical direction are formed inside the pack external heat exchanger 22B. The conduits 221B may be made of metal such as aluminum that has high heat conductivity. An upper region of each of these conduits 221B that is connected to the first connecting tube 22C is filled with the low-boiling agent in the vapor state that has flowed in from the first connecting tube 22C, and a lower region of each of these conduits 221B that is connected to the second connecting tube 22D is filled with the low-boiling agent that has changed from the vapor state to the liquid state.

In order to improve the heat exchange action by the heat transport device 2, a cooling fan 23 may be arranged inside the battery case 10. The cooling fan 23 is a fan that creates a circulating flow inside the battery case 10. The cooling fan 23 creates a circulating flow W1 by sending air that has been cooled by the pack internal heat exchanger 22A to the battery 11, and sending air that has been heated by cooling the battery 11 to the pack internal heat exchanger 22A. The cooling fan 23 may be operated by supplying electric power from the auxiliary battery 42 shown in FIG. 1. Also, the ECU 50 shown in FIG. 1 may control the driving of the cooling fan 23.

Here, one conceivable way to cool the battery 11 when the temperature inside the vehicle cabin has become high from the vehicle being stopped in the hot sun is to operate the air conditioner 43 and the intake fan 44 shown in FIG. 1. This method reduces the temperature inside the vehicle cabin by operating the air conditioner 43. Then the air in the cooled vehicle cabin is supplied to the battery 11 by operating the intake fan 44. However, this method requires energy for operating the air conditioner 43 and energy for operating the intake fan 44, so the amount of energy consumed increases. In contrast, in the second example embodiment, the battery 11 is cooled by operating only the cooling fan 23. Therefore, the amount of energy that is consumed may be made relatively small.

Also, in order to operate the air conditioner 43, electric power needs to be supplied from the battery 11 to the air conditioner 43, so the battery 11 generates heat as it discharges. In contrast, in the second example embodiment, the cooling fan 23 is driven by electric power supplied from the auxiliary battery 42, so heat generation by the battery 11 due to discharging does not need to be taken into account. As a result, the frequency with which the battery 11 is used is reduced, so a decrease in the life of the battery 11 is suppressed.

Furthermore, in the second example embodiment, the battery 11 is sufficiently protected from external heat by the battery case 10 having the multilayered structure described in the first example embodiment. Therefore, the cooling fan 23 does not need to be driven at a high speed in order to, increase the cooling capacity. Accordingly, the electric power required to operate the cooling fan 23 may be reduced.

Next, the operation of the heat transport device 2 will be described with reference to FIG. 3. A case is assumed in which initially the temperature of the battery 11 is high due to the vehicle 200 being stopped in a high temperature environment while the ignition switch of the vehicle 200 is off. When the temperature of the battery 11 rises further, the low-boiling agent boils and changes from a liquid state to a vapor state inside the conduits 221A of the pack internal heat exchanger 22A.

At this time, the air around the pack internal heat exchanger 22A is cooled, by vaporization heat, and the cooled air is sent to the battery 11 by the circulating flow W1. The battery 11 is cooled by this cooled air. The air that has increased in temperature from the heat exchange with the battery 11 is then sent to the pack internal heat exchanger 22A by the circulating flow W1.

Meanwhile, the low-boiling agent in a vapor state generated inside the conduits 221A of the pack internal heat exchanger 22A moves upward by a difference in specific gravity between it and the low-boiling agent in the liquid state, and flows through the first connecting tube 22C and into the conduits 221B of the pack external heat exchanger 22B.

Inside the ventilating duct 21, when the vehicle 200 is stopped, the air inside the ventilating duct 21 becomes heated from external heat from the inside the vehicle cabin and the vehicle body, so negative pressure is applied to the lower portion of the ventilating duct 21 (i.e., a so-called chimney effect comes into play). As a result, an air flow W2 from the lower side toward the upper side of the vehicle 200 is generated. The low-boiling agent in the vapor state that has moved inside the pack external heat exchanger 22B is cooled by this air flow W2 and consequently returns to the liquid state.

The low-boiling agent that has returned to the liquid state falls down by its own weight inside the second connecting tube 22D, and flows into the conduits 221A of the pack internal heat exchanger 22A. The low-boiling agent in the liquid state that has flowed into the conduits 221A undergoes heat exchange with the air that has increased in temperature as a result of cooling the battery 11, and thus changes into the vapor state.

In this way, in this example embodiment, the heat transport device 2 is provided with the first connecting tube 22C that has the vertical tube 221C that extends in the vertical direction of the vehicle 200, and the second connecting tube 22D that has the vertical tube 221D that extends in the vertical direction of the vehicle 200, so the low-boiling agent is naturally circulated, i.e., moved, between the pack internal heat exchanger 22A and the pack external heat exchanger 22B. Neither a pump for sending the low-boiling agent, as the heat transport device 2, nor a power supply or the like for driving the pump is necessary, so heat inside the battery case 10 is exhausted to the ventilating duct 21, while suppressing the amount of energy that is consumed.

Also, the heat that has been exhausted to the ventilating duct 21 is exhausted naturally outside the vehicle by the so-called chimney effect described above. Therefore, neither a blower portion as the heat transport device 2 for transferring the heat that has been exhausted to the ventilating duct 21 outside the vehicle, nor a power supply for driving the blower portion or the like is necessary. Therefore, the amount of energy that is consumed is suppressed.

In this example embodiment, the basic viewpoint is that while the vehicle is running, the battery 11 is cooled mainly by drawing in air from inside the vehicle cabin, and while the vehicle is stopped, the battery is cooled by the multilayered structure of the battery case 10 and the heat transport device 2, but the invention is not limited to this.

For example, the cooling path that draws in air from inside the vehicle cabin and cools the battery 11 may be omitted. While the vehicle is running, an air flow in which air is drawn in at the lower portion of the ventilating duct 21 and exhausted at the upper portion of the ventilating duct 21 by the Venturi effect is created, so the heat that has been exhausted from the pack external heat exchanger 22B to the ventilating duct 21 naturally escapes out of the vehicle. Therefore, even while the vehicle is running, the battery 11 is efficiently cooled by the multilayered structure of the battery case 10 and the heat transport device 2.

Here, the input/output characteristic of the battery 11 decreases when the temperature of the battery 11 decreases. Therefore, when the outside air is an extremely low temperature such as below zero, for example, when the on-off valve 21C is positioned in the open position, the temperature of the battery 11 drops due to the outside air, and the output of the battery 11 consequently decreases. In order to prevent such a decrease in output, when the temperature of the outside air is lower than 10° C. (a threshold value), for example, the on-off valve 21C is operated to the closed position to suppress heat radiation to the outside air. The on-off valve 21C may be arranged in the pack internal heat exchanger 22A, or it may be arranged in both the inlet 21A and the outlet 21B.

Here, the on-off valve 21C may be driven by a drive motor, not shown. In this case, the driving portion that drives the on-off valve 21C may be realized by the drive motor, the ECU 50 shown in FIG. 1, an auxiliary battery 42 that supplies driving electric power to the drive motor, and an outside air temperature sensor 45 all working together. That is, when the ECU 50 determines that the outside air temperature is lower than 10° C. based on temperature information obtained by the outside air temperature sensor 45, the ECU 50 outputs a drive signal to the drive motor and operates the on-off valve 21C from the open position to the closed position.

In this second example embodiment, the pack external heat exchanger 22B is arranged in the curved portion 21D of the ventilating duct 21, but it may also be arranged in another position. This other position may be any position as long as it is within an unirradiated region other than an irradiated region that is irradiated by direct sunlight that enters the ventilating duct 21 from the outlet 21B. For example, the ventilating duct 21 may include a curved portion and a straight tube portion positioned below the curved portion in the vertical direction of the vehicle 200. Further, the pack external heat exchanger 22B may be arranged in the straight tube portion. The curved portion may be provided midway in the ventilating duct 21.

Next, the effect of this example embodiment will be described in detail with reference to an example. FIG. 6A is a graph showing the results of a measured change in temperature over time in single cells that are included in a battery according to a comparative example. In this comparative example, a battery pack in which a battery case is formed with only galvanized steel sheet is provided in a plug-in hybrid vehicle. Also in the comparative example, the heat transport device 2 is omitted. FIG. 6B is a graph showing the results of a measured change in temperature over time in single cells according to an example. In this example, the structure of the second example embodiment, i.e., the battery pack 1 and the heat transport device 2, is provided in a plug-in hybrid vehicle.

In FIGS. 6A and 6B, the term "stopped" refers to a period of time during which the plug-in hybrid vehicle is stopped with the ignition switch of the vehicle being off. Therefore, during the period of time that the vehicle is stopped, cooling using the intake fan 44 shown in FIG. 1 is stopped. The term "running" refers to a period of time during which the plug-in hybrid vehicle is actually running by driving only the engine 34 shown in FIG. 1, driving only the motor-generator MG2, or driving both the engine 34 and the motor-generator MG2. The term "charging" refers to a period of time during which the plug-in hybrid vehicle is charging by connecting a connector of a charging cable that extends from an external power supply to the charging inlet 62 shown in FIG. 1. In order to compare the test results using the same criteria, the temperatures of the single cells of the example and the comparative example were measured on the same test day and at the same test location.

Referring to FIG. 6A, with the comparative example, there is a period of time during which the temperature inside the battery case rises above the melting point of the phase-change heat storage material 10C when the vehicle is stopped. On the other hand, referring to FIG. 6B, with the example, the temperature inside the battery case was always kept to the temperature of the melting point of the phase-change heat storage material 10C or a temperature below the melting point. As a result, it is evident that with the example, a rise in temperature of the single cells is suppressed approximately 5° C. lower than it is in the comparative example. That is, it is evident that with the example embodiment, a rise in temperature of the battery is effectively suppressed while the vehicle is stopped, in particular.

Figure 7:
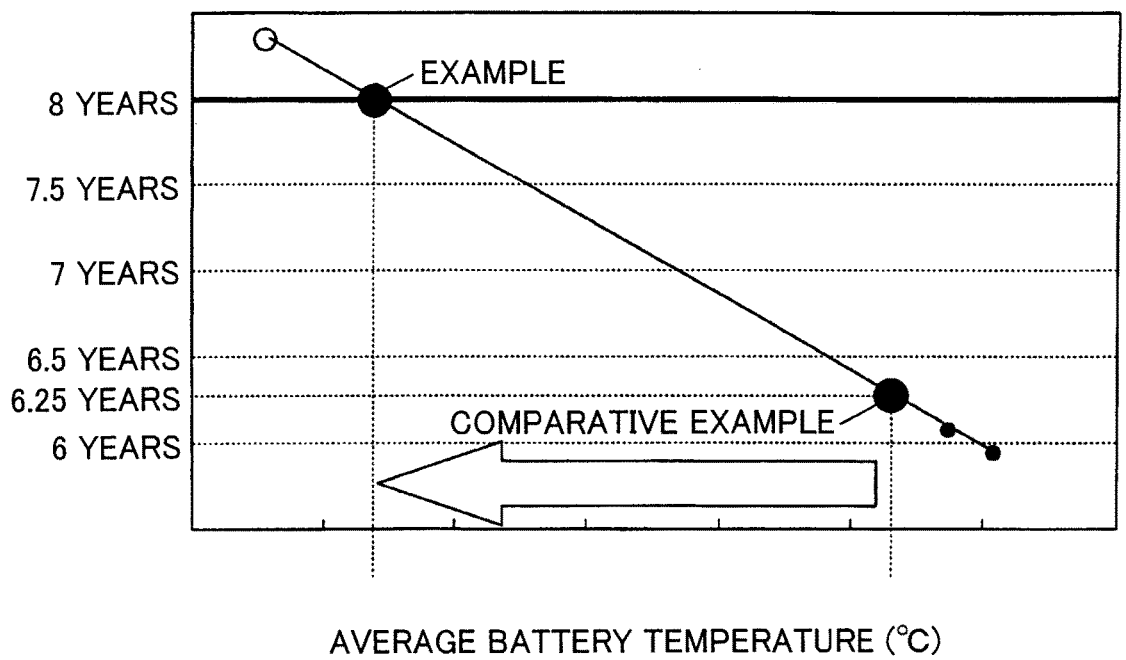
FIG. 7 is a graph comparing the battery life in the comparative example with the battery life in the example embodiment.

The difference between the life of the battery pack of the comparative example and the life of the battery pack of the example will be described with reference to FIG. 7. In the comparative example, the life of the battery is estimated to be approximately 6.25 years because the average battery temperature is high. However, in the example, the life of the battery is approximately 8 years (an estimated value) because the average battery temperature is relatively low. These results demonstrate the effect of the second example embodiment.

In the example embodiment described above, the low-boiling agent that circulates between the pack internal heat exchanger 22A and the pack external heat exchanger 22B is naturally circulated by the difference in specific gravity based on the liquid state and the solid state, but the invention is not necessarily limited to this. For example, a method that involves forcibly circulating refrigerant using pumping means such as a pump may also be used. In this case, the pack external heat exchanger 22B does not necessarily have to be arranged higher than the pack internal heat exchanger 22A, and the refrigerant used may be refrigerant that always remains in a liquid state. For example, fluorinert may be used as this type of refrigerant. This enables the degree of freedom in design of the vehicle to be increased. A rise in temperature of the battery 11 is suppressed by the multilayered structure of the battery case 10, so the electric power used for the pumping means such as a pump may be less. For example, the electric power consumption may be kept down by driving the pump or the like intermittently, or by circulating the refrigerant slowly.

The invention claimed is:

1. A vehicle comprising:
 a battery case that includes a first layer, a second layer and a third layer;
 a motor that generates motive power for running the vehicle;
 a battery that supplies electric power to operate the motor, wherein: the first layer is made of metal;
  the second layer is made of heat insulating material, and is closer to the battery than the first layer is; and
  the third layer is made of phase-change heat storage material, and is closer to the battery than the second layer is;
 a heat radiating portion of the vehicle; and
 a heat transport device that is provided with a first heat exchanger, a second heat exchanger, and a circulation path that circulates refrigerant between the first heat exchanger and the second heat exchanger, wherein:
  the first heat exchanger is arranged inside the battery case;
  the second heat exchanger is arranged in the heat radiating portion, outside of the battery case, and positioned higher than the first heat exchanger in a vertical direction of the vehicle;
  the circulation path has a first connecting tube with a first vertical tube that extends in the vertical direction of the vehicle, and a second connecting tube with a second vertical tube that extends in the vertical direction of the vehicle;
  the first connecting tube is configured to move the refrigerant to the second heat exchanger, the refrigerant having changed from a liquid state to a vapor state through first heat exchange with air inside the battery case;
  the first heat exchange is performed in the first heat exchanger;
  the second connecting tube is configured to move the refrigerant to the first heat exchanger, the refrigerant having changed from the vapor state to the liquid state through second heat exchange with the heat radiating portion;
  the second heat exchange is performed in the second heat exchanger; and
  the heat transport device is configured to circulate the refrigerant between the first heat exchanger and the second heat exchanger through the process of natural circulation, without forced circulation, via the first connecting tube and the second connecting tube.

2. The vehicle according to claim 1, wherein the heat radiating portion is a ventilating duct that allows air to flow between inside and outside of the vehicle.

3. The vehicle according to claim 2, wherein:
the second heat exchanger is arranged in an unirradiated region inside the ventilating duct; and
the unirradiated region is not irradiated by direct sunlight that enters the ventilating duct.

4. The vehicle according to claim 3, wherein;
the ventilating duct has an inclined tube portion and a straight tube portion that extends in a vertical direction of the vehicle; and
the second heat exchanger is arranged in the inclined tube portion;
the inclined tube portion is inclined with respect to the vertical direction of the vehicle and includes the unirradiated region.

5. The vehicle according to claim 2, wherein an on-off valve is provided in the ventilating duct, the on-off valve operating between an open position that allows air to pass through and a closed position that inhibits air from passing through.

6. The vehicle according to claim 5, further comprising a driving portion that drives the on-off valve, wherein
the driving portion is configured to operate the on-off valve to the closed position when a temperature outside the vehicle is lower than a predetermined threshold value, and is configured to operate the on-off valve to the open position when the temperature outside the vehicle is equal to or higher than the predetermined threshold value.

7. The vehicle according to claim 6, wherein the predetermined threshold value is set based on an input/output characteristic of the battery.

8. The vehicle according to claim 1, further comprising:
a ventilating duct that allows air to flow between inside and outside of the vehicle;
wherein:
the second heat exchanger is arranged in the ventilating duct, outside of the battery case;
the second heat exchanger is arranged in an unirradiated region inside the ventilating duct; and
the unirradiated region is not irradiated by direct sunlight that enters the ventilating duct.

9. The vehicle according to claim 1, wherein the battery is a group of batteries in which a plurality of single cells are arranged.

10. The vehicle according to claim 1, further comprising a conduit within the first heat exchanger connecting the first connecting tube and the second connecting tube, the first heat exchange with (i) air inside the battery case and outside the conduit, and (ii) refrigerant inside the conduit.

* * * * *